United States Patent [19]

Goto

[11] Patent Number: 5,617,521
[45] Date of Patent: Apr. 1, 1997

[54] THREE-DIMENSIONAL IMAGE SHADING METHOD USING VOLUME RENDERING OF SHADING PIXEL AREA HAVING A SMALL PIXEL VALUE GRADIENT

[75] Inventor: Yoshihiro Goto, Tokyo, Japan

[73] Assignee: Hitachi Medical Corporation, Tokyo, Japan

[21] Appl. No.: 306,611

[22] Filed: Sep. 15, 1994

[30]  Foreign Application Priority Data

Oct. 15, 1993 [JP]  Japan .................................... 5-258199

[51] Int. Cl.$^6$ ................................................. G06T 15/00
[52] U.S. Cl. ............................................................ 395/126
[58] Field of Search .................................... 395/124, 126, 395/129; 364/413.13–413.27

[56]  References Cited

U.S. PATENT DOCUMENTS 4,866,612  9/1989  Takagi et al. ...................... 363/413.22

OTHER PUBLICATIONS

Levoy, Marc, "Efficient Ray Tracing of Volume Data", *ACM Transactions on Graphics*, vol. 9, No. 3, Jul. 1990, pp. 245–261.

Levoy, Marc, "Display Rendering: Display of Surfaces from Volume Data", *IEEE Computer Graphics and Applications Magazine*, vol. 8, iss 3, May, 1988, pp. 29–37.

Magnusson, et al, "Evaluation of Method for Shaded Surface Display of CT–Volumes", *Pattern Recognition, 1988 9th International Conference*, pp. 1278–1294.

Hilman, et al, "Measurement of Carpal Bone Geometry in CT Images", *Nuclear Science Symposium and medical Imaging Conference*, 1991, pp. 1835–1838.

Townsend, et al, "Automatic Edge Extraction Using Locally Adaptive Threshold", *Electronics Letters*, vol. 24, iss 11, May 26, 1988, pp. 711–712.

Chu et al, "3–Dimensional Rendering of MR (magnetic Resonance) Images", *WESCANEX 93: Communications, Computers & Power in the Modern Environment*, pp. 165–170.

Rusinek, Henry, "Automatic Identification of Tissue Interfaces", *Engineering in Medicine and Biology*, 1989 Internationa Conference.

Montine, James L., "A Procedural Interface for Volume Rendering", *Visualization 1990 Conference*, pp. 36–44.

Ney, Fishman, Magid, and Drebin, "Volumetric Rendering of Computed Tomography Data: Principles and Techniques", *IEEE Computer Graphics and Applications Magazine*, v10, n2, pp. 24–32, Mar. 1990.

Foley et al, "Computer Graphics: Principles and Practice, 2nd Ed." pp. 756, 1990.

Fuchs, Levoy, and Pizer, "Interactive Visualization of 3D Medical Data", *Computer Magazine*, vol. 20, No. 8, pp. 46–51, Aug. 1989.

Drebin, Carpenter, Hanrahan, "Volume Rendering", *Computer Graphics (ACM)*, v22, No. 4, pp. 65–74, Aug. 1988.

*Primary Examiner*—Heather R. Herndon
*Assistant Examiner*—Rudolph Buchei
*Attorney, Agent, or Firm*—Antonelli, Terry, Stout & Kraus, LLP

[57]  ABSTRACT

In a three-dimensional image shading method using a volume rendering algorithm, the amount of light incident to a view plane from voxels of a predetermined value or above is determined by modulating the amount of light incident to the voxels by a function of sin $\Theta$, where $\Theta$ is the angle of the surfaces of CT slices to a perpendicular line drawn from an arbitrarily selected origin of an orthogonal three-dimensional coordinate system on the view plane.

4 Claims, 5 Drawing Sheets

THREE-DIMENSIONAL IMAGE SHADING METHOD USING VOLUME RENDERING OF SHADING PIXEL AREA HAVING A SMALL PIXEL VALUE GRADIENT

BACKGROUND OF THE INVENTION

This invention relates to a three-dimensional image shading method for displaying a three-dimensional image shaded by projecting a slice-stacked three-dimensional image consisting of a plurality of stacked two-dimensional images, or slices on a two-dimensional view plane (or projection plane), and particularly to one in which even though the gradients of pixel values of a part of an image are zero, that part is shaded according to the viewing angle by use of the volume rendering technique as long as it actually includes a tissue.

For the mutual connection among a plurality of CT images and the cubic effect, the plurality of CT images are sometimes stacked to form a three-dimensional image. The result is that the three-dimensional image is displayed in a simulative manner on the view plane. In this case, the volume rendering technique can be used to project the slice-stacked three-dimensional image on the view plane. This technique is described in detail in "Computer Graphics, Vol.22, No.4, Aug. 1988, pp.65–74". In the volume rendering process, incident light to the view plane is assumed and a reflection coefficient and a transmission factor are arbitrarily set according to the CT values. The amount of light incident to the view plane can be obtained as the product of the amount of reflected light from each voxel and the gradient of the contour plane of CT values. Thus where the gradient of the contour plane of CT values is zero, the amount of reflected light to the view plane is zero. The tissue corresponding to the zero-gradient of CT values is regarded as a hollow and displayed in the same black color as air.

It is assumed that a threshold level for gradient is set for a series of CT gradients as for example shown in FIG. 1 in order for a cross section of a head to be displayed. The gradient of CT values is very small because the CT values for the inside of the bone do not increase or decrease, and thus the pixel values on the view plane are also decreased by a shading process. Therefore, the inside of the bone is displayed in the same black color as air as if it were a hollow (see FIG. 2). The tissue which should be actually seen seems to be a hollow and may be decided to be a hollow by mistake.

The phenomenon of such erroneous hollow representation always occurs when thick tissues are attempted to be displayed by the volume rendering method and thus this problem must be solved.

SUMMARY OF THE INVENTION

It is an object of the invention to provide a shading method capable of solving the problem that the actually existing tissues are displayed as hollows in the prior art, or shading the actual tissues in accordance with the viewing angle.

In order to achieve the above object, according to the shading process of the invention, the amount of light incident to the view plane from each voxel is modulated by a function of $\sin \Theta$ where $\Theta$ is the angle of the surfaces of CT slices to a perpendicular line drawn from the origin of an arbitrarily fixed orthogonal three-dimensional coordinate system to the view plane, and the obtained values are treated as pixel values on the view plane.

According to this invention, the inside of a cross section of a bone or others, even when shaded, is not seen to be a hollow but can be displayed like a real substance (see FIG. 3).

DESCRIPTION OF THE PREFERRED EMBODIMENTS

Figure 4:
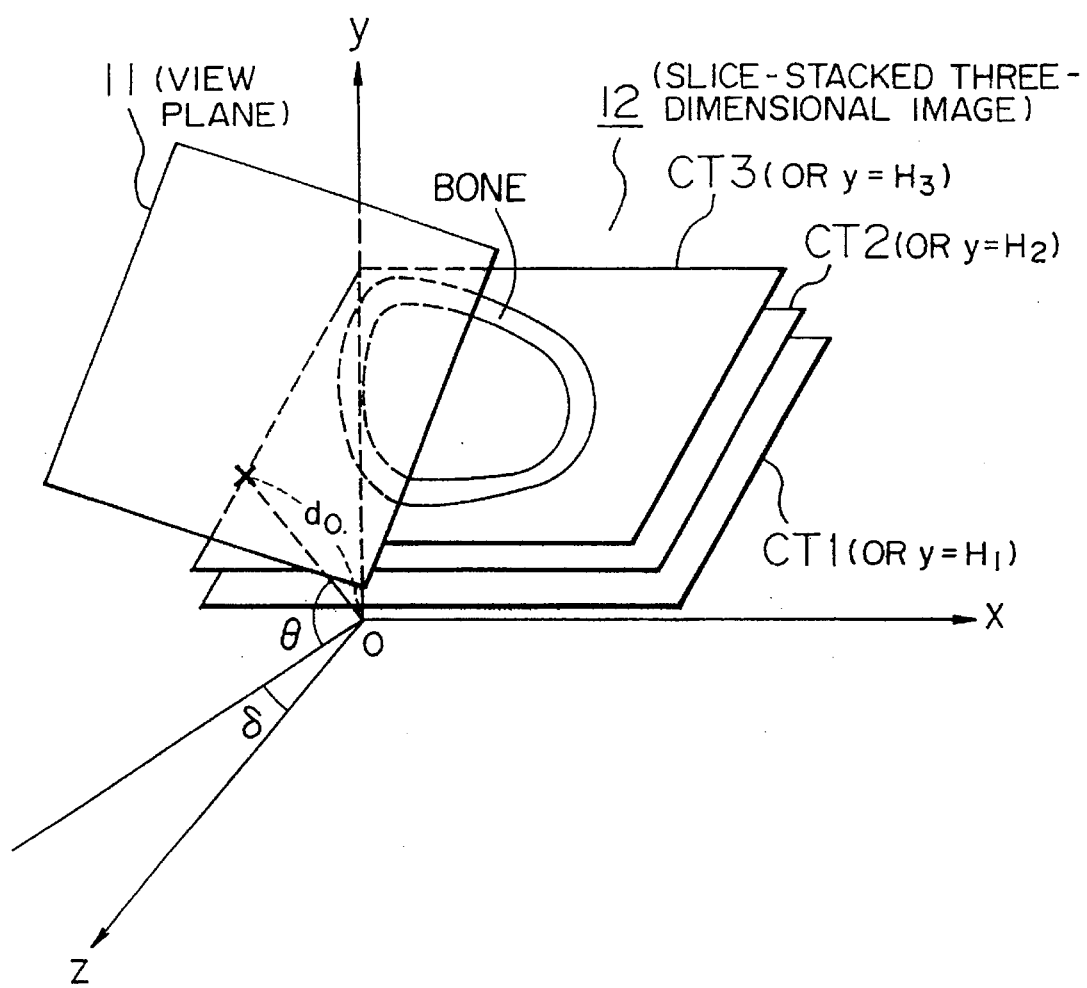
FIG. 4 is a diagram showing the principle of this invention.

FIG. 4 shows the voxel space of a three-dimensional image formed of a plurality of stacked two-dimensional images and the view plane which are drawn on orthogonal coordinates. Although this invention can be applied to any three-dimensional images, this embodiment is concerned with CT images. The surfaces of the CT slices of a slice-stacked three-dimensional image 12 are placed in parallel to the x-z plane of the orthogonal coordinate system. The origin is set at an arbitrary point. A view plane 11 onto which the slice-stacked three-dimensional image 12 is projected is represented by direction angles $\Theta$ and $\delta$ and a distance $d_o$ of a perpendicular line drawn from the origin to the view plane with respect to this coordinate system. In this case, $\Theta$ is the angle of the surfaces of the CT slices to the perpendicular line, or the gradient of the perpendicular line to the x-z plane. $\delta$ is the angle between the z-axis and a projection line obtained when the perpendicular line drawn from the origin onto the view plane 11 is projected onto the x-z plane. The distance $d_o$ is the length of the perpendicular line drawn from the origin to the view plane 11 and this value is fixed to be a proper value so that the view plane comes on the outside of the CT slices. The distance $d_o$ is usually preset by a program. The $\Theta$ angle is defined as the direction angle of the view plane 11.

The slice-stacked three-dimensional image 12 is formed of, for example, three stacked CT images, or slices CT1 (or $y=H_1$), CT2 (or $y=H_2$) and CT3 (or $y=H_3$).

In the prior art, when an image including a cross section of a bone is produced by shading, the density of the cross section of the bone was determined from the gradient of the contour plane of CT value multiplied by the amount of reflected light at a voxel. In this embodiment, the amount of reflected light at each voxel is modulated by the sine function of the direction angle $\Theta$ of the view plane, or sine $\Theta$. For example, it is modulated by $|(\sin \Theta)|^n$ ($n$ is a real number satisfying $n \geq 1$). That is, the modulation is made so that the pixel value is increased as the direction angle $\Theta$ of the view plane becomes close to 90 degrees and decreased as the direction angle $\Theta$ approaches to zero degree. This is represented by the following equation.

$A'_{ij}{}^{\infty}|\sin \Theta|^n$ where $A'_{ij}$ is the density after modulation and (i,j) designates the coordinates on the view plane.

Figure 1:
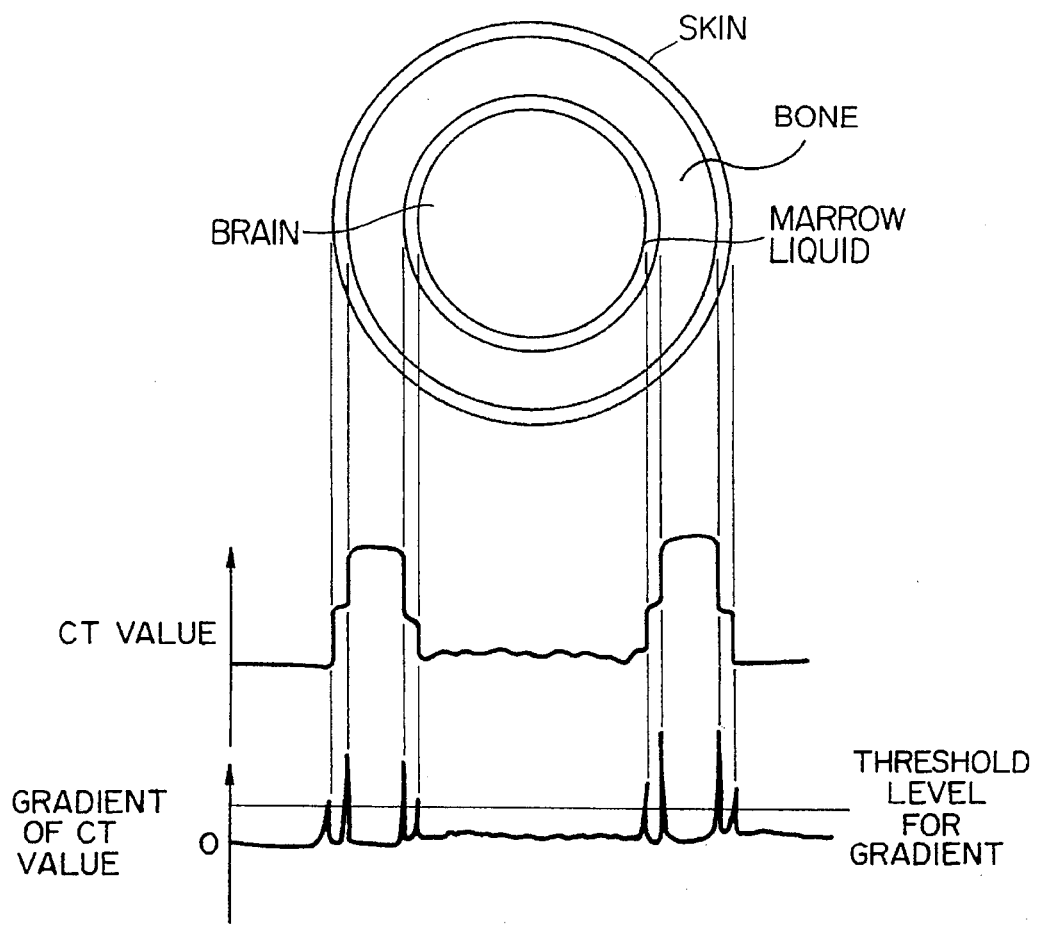
FIG. 1 is a diagram showing the relation between the CT value and the gradient of CT value in the volume rendering technique.
Figure 2:
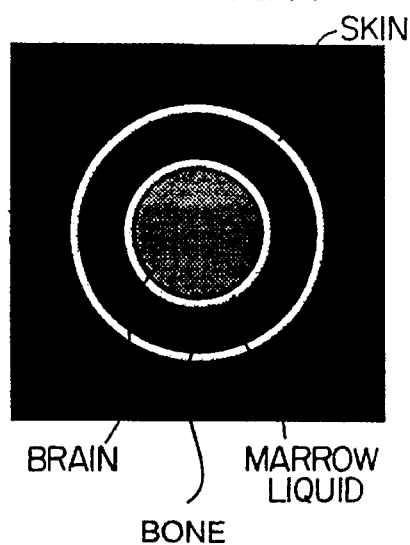
FIG. 2 shows a cross section of the bone model of FIG. 1 processed by the prior art.
Figure 3:
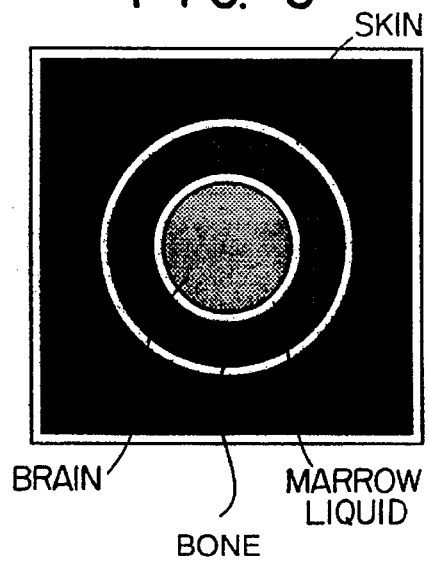
FIG. 3 shows a cross section of the bone model of FIG. 1 processed by this invention.

According to this embodiment, since the pixel value on the view plane is determined by modulating by the sine function of the direction angle $\Theta$ of the view plane, or sine $\Theta$ along the cross section of a bone, the pixel value is increased to be bright as the angle $\Theta$ of the view plane approaches to 90 degrees, or becomes parallel. Thus, as illustrated in FIG. 3 the inside of the bone is not seen as a hollow.

Figure 5:
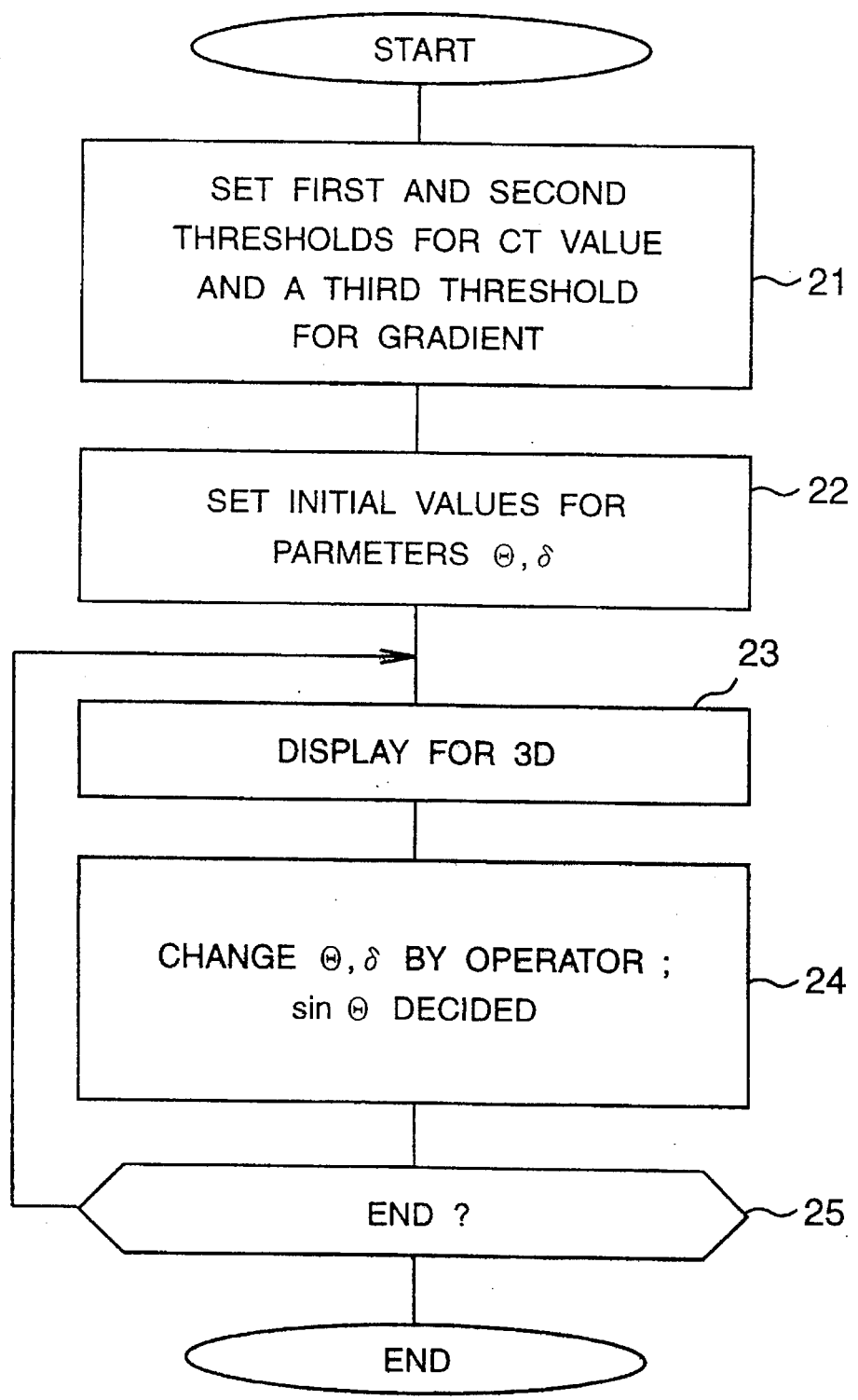
FIGS. 5 and 6 are flowcharts for displaying a three-dimensional image according to this invention using the volume rendering technique.

A method of displaying a three-dimensional image according to this invention which employs the volume rendering technique will be described with reference to the flowcharts of FIGS. 5 and 6.

At step 21, the operator sets the first and second threshold levels corresponding to the upper and lower limits of the CT value to be selected and the third threshold level for the gradient of CT value in order to select a portion which is desired to be observed.

At step 22, the operator sets the orthogonal three-dimensional coordinate system of x-axis, y-axis and z-axis so that the surfaces of the CT slices are parallel to the x-z plane. In this case, the origin of the orthogonal three-dimensional coordinate system is determined at an arbitrary point. The perpendicular line drawn from the origin to the view plane and the surfaces of the CT slices make an angle of $\Theta$. The z-axis and the projection line produced when the perpendicular line is projected onto the x-z plane makes an angle of $\delta$. In addition, the operator sets the initial values of the direction angles $\Theta$, $\delta$ which decide the position of the view plane, and the value of "n". The function $\sin \Theta$ and $|\sin \Theta|^n$ are automatically determined by a computer. The length of the perpendicular line which decides the distance from the origin to the view plane is previously set to be a proper value by a program so that the view plane comes on the outside of the slice-stacked three-dimensional image.

At step 23, a three-dimensional image is formed by a plurality of CT slices and displayed on the specified view plane. This step is comprised of detailed steps shown in FIG. 6.

At step 24, the operator resets the angles $\Theta$, to be proper values depending on the viewing angle toward the three-dimensional image. The new values of sine $\Theta$ and $|\sin \Theta|^n$ are automatically determined by the computer.

At step 25, the operator orders the program to end. If the operator does not desire to end the program, the program is jumped to step 23.

Figure 6:
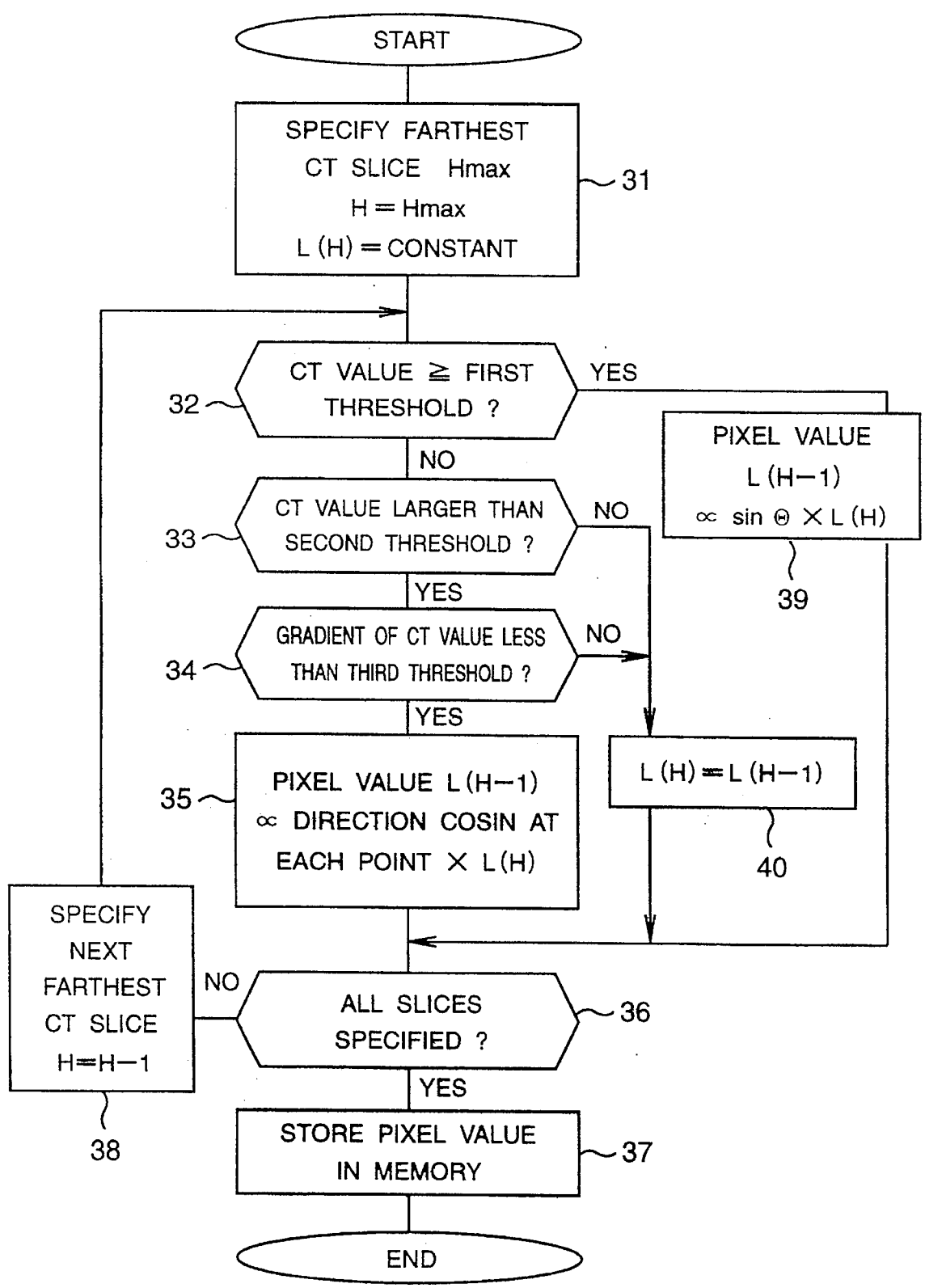

FIG. 6 is a detailed flowchart for displaying a three-dimensional image of for example a brain of a CT value to be distinguished from the skin of the same CT value.

Hereinafter, a single projection line will be considered, and the pixel point at which the projection line intersects with the CT image will be discussed. If the size of the three-dimensional image is 512×512, the same number of projection lines exist.

In practice, the light from the view plane is partially reflected back to the view plane because of the reflection coefficient and transmission factor which are set according to the CT value of each voxel. In order to simplify the model, it is assumed that a light source is placed behind the CT image opposite to the view plane. In other words, it is assumed that light comes from the opposite side to the view plane, passes through the CT image and is incident to the view plane.

At step 31, the operator specifies the farthest CT image from the view plane. The CT image number is represented by H and the amount of incident light to the CT image number H by L(H). Here, L(H)=constant, and H=Hmax.

At step 32, the CT value is compared with the first threshold which is the upper threshold which was set for extraction of the brain. If the CT value is larger than the first threshold, the program is jumped to step 39 at which the shading process according to this invention is performed. If the CT value is not larger, the program goes to step 33.

At step 33, the CT value is compared with the second threshold which is the lower threshold which was set for brain extraction. If the CT value is larger than the second threshold, the program goes to step 34 since the CT value is within the window set by the first and second thresholds. If it is not so, the tissue is not necessary to be displayed, and thus the program is jumped to step 40 for a transparency process.

At step 34, to decide if the specified pixel represents the brain or the skin, the gradient of the pixel value is compared with the third threshold which was set for brain extraction. The gradient of the pixel value of the skin surrounded by air is larger than that of the brain in which the same tissue is spread. Therefore, if the gradient of the pixel value is smaller than the third threshold, it is regarded as the brain and thus the program goes to step 35. If it is not so, the tissue is considered as the skin and thus the program is jumped to step 40 for a transparency process.

At step 35, the amount of transmitted light is made to be proportional to the product of the amount of incident light L(H) and the direction cosine value of the gradient of the pixel value. Then, the program goes to step 36.

The direction cosine value is given by the following equation.

$$\text{Direction cosine value} = \frac{\Delta I_z \cdot \cos\delta + \Delta I_x \cdot \sin\delta}{\sqrt{(\Delta I_x)^2 + (\Delta I_y)^2 + (\Delta I_z)^2}}$$

where $\delta$ is the angle in FIG. 4, and $\Delta I_x$, $\Delta I_y$ and $\Delta I_z$ are the gradients of the pixel values in the x-direction, y-direction and z-direction, respectively. According to this embodiment, the brain can be distinguished from not only the bone but also the skin and extracted to be displayed from the slice-stacked three-dimensional image.

At step 36, a decision is made of whether all the CT images have been specified. If all CT images are specified, the program goes to step 37. If it is not so, the program goes to step 38.

At step 37, since it is preferable to make the transparency-processed part dark and the other part bright, values of Cmax-L(H) are stored in a memory as the pixel values of the three-dimensional image. Here, Cmax is a mere constant and satisfies the condition of [Cmax-L(H)]>0.

At step 38, the next farthest CT image (H-1) is designated.

At step 39, the value resulting from modulating the amount of light incident to a voxel by the function of $\sin \Theta$ is treated as the amount of transmitted light. As an example, the amount of transmitted light is made proportional to the product of the amount of incident light L(H) and $|\sin \Theta|^n$ where n is a real number satisfying $n \geq 1$. Then, the program goes to step 36.

At step 40, for transparency, the process for the amount of incident light L(H)=the amount of transmitted light L(H-1) is performed. Then, the program goes to step 36.

Figure 7:
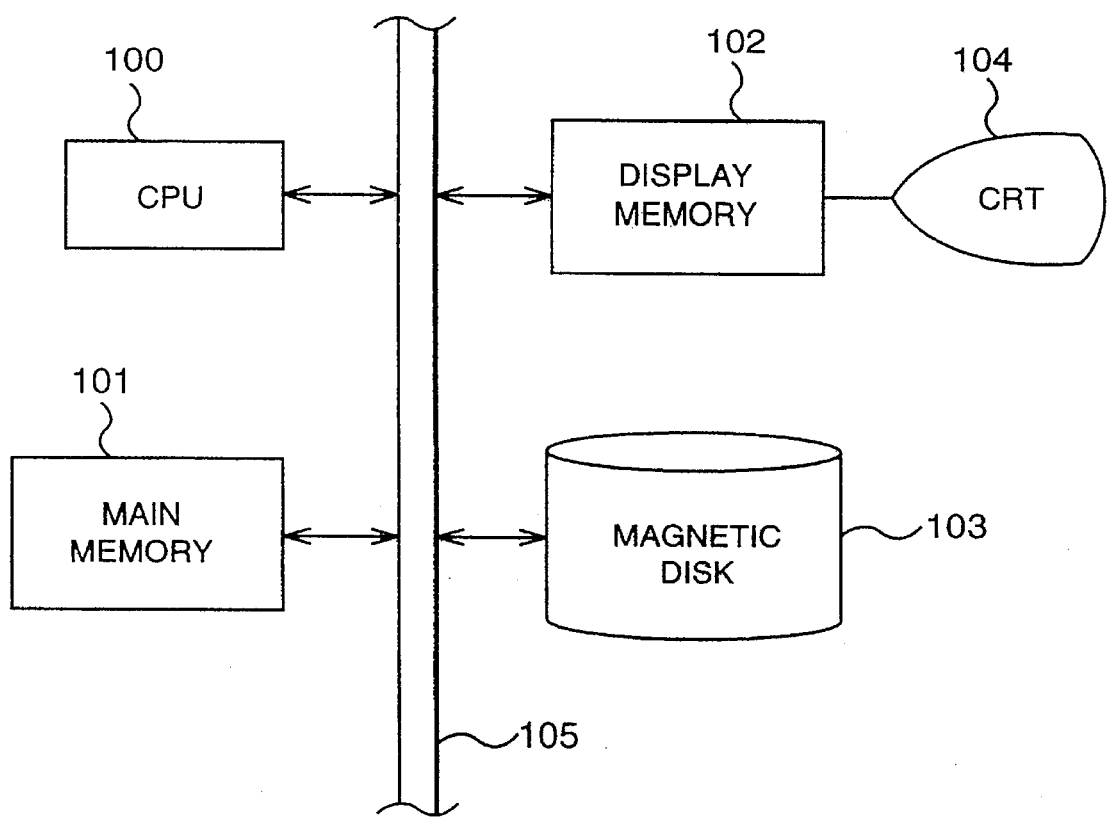
FIG. 7 is a diagram showing the construction of hardware for realizing this invention.

FIG. 7 shows a processing system by which the embodiments of the invention can be realized. A common bus 105 is connected to a CPU 100, a main memory 101, a display memory 102 and a magnetic disk 103. The magnetic disk 103 has a plurality of CT images stored. The CPU 100 reads the CT images, makes the volume rendering process by use of the main memory 101 and supplies the result to the display memory 102 so that it is displayed on a CRT 104. Also in the magnetic disk 103 is stored the result of the volume rendering process in order to be used later.

This invention can also be applied to a three-dimensional image which is formed of stacked MRI images.

What is claimed is:

1. A three-dimensional image shading method using a volume rendering algorithm comprising the steps of:

setting certain upper and lower thresholds for extraction of pixel values and a threshold for a gradient of a pixel value by an operator;

setting an orthogonal three-dimensional coordinate system of x-axis, y-axis and z-axis so that an x-z plane is made parallel to surfaces of stacked slices of a slice-stacked three-dimensional image by the operator and inputting values of $\Theta$ and $\delta$ by the operator where $\Theta$ is the angle of said surfaces of slices to a perpendicular line drawn from an arbitrarily selected origin of said orthogonal three-dimensional coordinate system on a view plane and $\delta$ is the angle of said z-axis to a projection line of said perpendicular line projected on the x-z plane;

modulating an amount of light passing through said pixel by a function of sin $\Theta$, when said pixel value is larger than said upper threshold to determine a first value corresponding to a pixel of said view plane;

subjecting said pixel value to a transparency process to determine a second value corresponding to a pixel of said view plane, when said pixel value is equal to or smaller than said lower threshold, or when said pixel value is larger than said lower threshold and equal to or smaller than said upper threshold and a gradient of said pixel value is larger than said threshold for the gradient;

modulating an amount of light passing through said pixel by a value of the gradient of said pixel value to determine a third value corresponding to a pixel of said view plane, when said pixel value is equal to or smaller than said lower threshold and the gradient of said pixel value is equal to or smaller than said threshold for the gradient; and constructing an image on the basis of said first, second and third values.

2. A three-dimensional image shading method according to claim 1, wherein said step of modulating an amount of light by a function sin $\Theta$ includes, step for determining the amount of light incident to said view plane from said pixel as a value proportional to the product of the amount of light incident to said pixel and $|\sin \Theta|^n$, where n is a real number satisfying n$\geq$1.

3. A three-dimensional image shading method using a volume rendering algorithm comprising the steps of:

setting a first threshold value as an upper threshold value for extraction of a region of interest by an operator;

comparing a pixel value of a first pixel selected from slice-stacked three-dimensional image data with said first threshold value;

when said pixel value is larger than said first threshold value, determining a value corresponding to a second pixel of a view plane by modulating said pixel value with a function of sin $\Theta$, where e is an angle between a slice surface of a sliced-stacked three-dimensional image data and a perpendicular line drawn from an orthogonal three-dimensional coordinate system set with respect to said slice-stacked three-dimensional image data to said view plane, and when said pixel value is equal to or smaller than said first threshold value, determining a value corresponding to the second pixel of the view plane by modulating said pixel value with a function of direction cosine of gradients of pixel values or outputting said pixel value as a value corresponding to said second pixel of the view plane, said first pixel being projected onto said second pixel of said view plane;

performing said steps of comparing and determining for every first pixel of said slice-stacked three-dimensional image data; and constructing an image on the basis of said values corresponding to said second pixels of said view plane.

4. A three-dimensional image shading method according to claim 3, wherein the step of modulating an amount of light by a function of sin $\Theta$ comprises a step of determining the amount of light passing through said pixel as a value proportional to a product of an amount of light incident to said pixel and $|\sin \Theta|^n$, where n is a real number satisfying n$\geq$1.

\* \* \* \* \*